United States Patent
Kushalappa et al.

(10) Patent No.: US 11,008,050 B2
(45) Date of Patent: May 18, 2021

(54) HYBRID STRUCTURES AND METHODS OF MAKING THE SAME

(71) Applicant: SABIC GLOBAL TECHNOLOGIES B.V., Bergen op Zoom (NL)

(72) Inventors: Poovanna Theethira Kushalappa, Bangalore (IN); Dinesh Munjurulimana, Farmington Hills, MI (US); Arunachala Parameshwara, Bangalore (IN); Raghavendra Janiwarad, Bangalore (IN); Dhanendra Kumar Nagwanshi, Farmington Hills, MI (US); Matthew Michael Delaney, Canton, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/474,629

(22) PCT Filed: Dec. 28, 2017

(86) PCT No.: PCT/IB2017/058459
§ 371 (c)(1),
(2) Date: Jun. 28, 2019

(87) PCT Pub. No.: WO2018/122761
PCT Pub. Date: Jul. 5, 2018

(65) Prior Publication Data
US 2019/0344836 A1     Nov. 14, 2019

Related U.S. Application Data

(60) Provisional application No. 62/440,546, filed on Dec. 30, 2016.

(51) Int. Cl.
*E04C 3/00* (2006.01)
*B62D 29/00* (2006.01)
(Continued)

(52) U.S. Cl.
CPC ............ *B62D 29/004* (2013.01); *B29C 70/68* (2013.01); *B60R 19/03* (2013.01); *B60R 19/18* (2013.01);
(Continued)

(58) Field of Classification Search
CPC ...... B62D 25/04; B62D 29/005; B62D 21/02; B62D 29/00; B62D 21/15; B62D 27/02;
(Continued)

(56) References Cited

U.S. PATENT DOCUMENTS 2,882,564 A   4/1959   Couse et al.
3,162,745 A   12/1964  Rohr
(Continued)

FOREIGN PATENT DOCUMENTS

CA   2361761 A1   10/2000
CA   2394790 A1   5/2001
(Continued)

OTHER PUBLICATIONS

European Patent No. 0661198 (A1); Publication Date: Jul. 5, 1995; Abstract Only; 2 Pages.
(Continued)

*Primary Examiner* — Chi Q Nguyen
(74) *Attorney, Agent, or Firm* — Cantor Colburn LLP (57) ABSTRACT

A hybrid structure includes a frame member with at least three walls, forming a channel having a convex portion where two walls meet. A concave deformation is present in at least one convex portion, wherein the concave deformation extends into the channel and has open ends forming an opening through the convex portion. A plastic reinforcement member is present in the channel, wherein a portion of the reinforcement member extends into the opening and on the concave deformation.

20 Claims, 6 Drawing Sheets

(51) Int. Cl.

| | | |
|---|---|---|
| *B29C 70/68* | (2006.01) | |
| *B60R 19/03* | (2006.01) | |
| *B60R 19/18* | (2006.01) | |
| *B62D 21/02* | (2006.01) | |
| *B62D 21/15* | (2006.01) | |
| *B62D 25/04* | (2006.01) | |
| *B62D 25/08* | (2006.01) | |
| *B62D 25/20* | (2006.01) | |
| *B62D 27/02* | (2006.01) | |
| *B29K 101/12* | (2006.01) | |
| *B29K 705/02* | (2006.01) | |
| *B29K 705/12* | (2006.01) | |
| *B29L 31/30* | (2006.01) | |

(52) U.S. Cl.
CPC ............. *B62D 21/02* (2013.01); *B62D 21/15* (2013.01); *B62D 25/04* (2013.01); *B62D 25/08* (2013.01); *B62D 25/20* (2013.01); *B62D 27/02* (2013.01); *B62D 27/026* (2013.01); *B29K 2101/12* (2013.01); *B29K 2705/02* (2013.01); *B29K 2705/12* (2013.01); *B29L 2031/3002* (2013.01); *B60R 2019/1806* (2013.01)

(58) Field of Classification Search
CPC .. B62D 27/026; B62D 21/152; B62D 29/004; B62D 25/08; B62D 25/20; B62D 25/00; B62D 27/00; B60R 19/18; B60R 19/03; B60R 2019/1806; B29C 70/68; B29C 70/683; B29K 2101/12; B29K 2705/12; B29K 2705/02; B29L 2031/3002; F16B 11/006; Y10T 403/472; Y10T 403/74; Y10T 29/49826
USPC .......... 52/831, 848, 854; 403/267, 404, 172, 403/270; 29/428, 505, 506
See application file for complete search history.

(56) References Cited

U.S. PATENT DOCUMENTS

| | | | |
|---|---|---|---|
| 3,842,944 A | 10/1974 | Shiotani et al. | |
| 4,227,593 A | 10/1980 | Bricmont et al. | |
| 4,357,040 A | 11/1982 | Tomioka et al. | |
| 4,890,877 A | 1/1990 | Ashtiani-Zarandi et al. | |
| 5,139,297 A | 8/1992 | Carpenter et al. | |
| 5,139,843 A | 8/1992 | Murakami et al. | |
| 5,164,141 A | 11/1992 | Becker et al. | |
| 5,190,803 A * | 3/1993 | Goldbach | B29C 37/0085 |
| | | | 264/261 |
| 5,306,066 A | 4/1994 | Saathoff | |
| 5,354,604 A | 10/1994 | Blakeman et al. | |
| 5,480,729 A | 1/1996 | Hattori et al. | |
| 5,518,802 A | 5/1996 | Colvin et al. | |
| 5,529,826 A | 6/1996 | Tailor et al. | |
| 5,682,667 A | 11/1997 | Flagg | |
| 5,715,917 A | 2/1998 | Smallwood | |
| 5,804,511 A | 9/1998 | Kelman et al. | |
| 5,819,408 A | 10/1998 | Catlin | |
| 5,836,547 A | 11/1998 | Koch et al. | |
| 5,975,623 A | 11/1999 | Shikimachi et al. | |
| 6,050,631 A | 4/2000 | Suzuki et al. | |
| 6,158,771 A | 12/2000 | Nusser et al. | |
| 6,299,958 B1 | 10/2001 | St. Julien et al. | |
| 6,336,249 B1 | 1/2002 | Plumley | |
| 6,547,295 B2 | 4/2003 | Vismara | |
| 6,592,174 B1 | 7/2003 | Rollin et al. | |
| 6,668,513 B2 * | 12/2003 | Roberts | B62D 25/145 |
| | | | 296/205 |
| 6,746,061 B1 | 6/2004 | Evans | |
| 6,866,294 B2 | 3/2005 | Horsch et al. | |
| 6,866,331 B2 | 3/2005 | Kropfeld | |
| 6,938,936 B2 | 9/2005 | Moojiman et al. | |
| 6,942,910 B2 * | 9/2005 | Roberts | B29D 22/00 |
| | | | 296/208 |
| 7,004,502 B2 | 2/2006 | Borroni-Bird et al. | |
| 7,008,006 B2 | 3/2006 | Steinhauser et al. | |
| 7,879,435 B2 | 2/2011 | Mett et al. | |
| 8,047,603 B2 | 11/2011 | Goral et al. | |
| 8,158,539 B2 | 4/2012 | Balthes | |
| 8,303,743 B2 | 11/2012 | Youn et al. | |
| 8,322,780 B2 | 12/2012 | Nagwanshi et al. | |
| 8,336,933 B2 | 12/2012 | Nagwanshi et al. | |
| 8,474,583 B2 | 7/2013 | Nagwanshi et al. | |
| 8,864,216 B2 | 10/2014 | Nagwanshi et al. | |
| 9,238,347 B2 | 1/2016 | Nelson et al. | |
| 10,072,690 B2 * | 9/2018 | Fleischheuer | B60N 2/686 |
| 10,232,889 B2 * | 3/2019 | Kellner | B62D 29/04 |
| 2002/0017805 A1 | 2/2002 | Carroll, III et al. | |
| 2002/0043809 A1 | 4/2002 | Vismara | |
| 2002/0070584 A1 | 6/2002 | Carroll, III et al. | |
| 2002/0121714 A1 | 9/2002 | Preisler | |
| 2002/0121718 A1 | 9/2002 | Winget et al. | |
| 2002/0121723 A1 | 9/2002 | Preisler et al. | |
| 2002/0121787 A1 | 9/2002 | Tarahomi et al. | |
| 2003/0008105 A1 * | 1/2003 | Haack | B32B 27/32 |
| | | | 428/136 |
| 2004/0037625 A1 * | 2/2004 | Corrias | B62D 29/001 |
| | | | 403/172 |
| 2004/0051321 A1 | 3/2004 | Hanai et al. | |
| 2004/0094684 A1 * | 5/2004 | Sailer | B62D 29/004 |
| | | | 248/424 |
| 2004/0232591 A1 | 11/2004 | Dajek et al. | |
| 2006/0181089 A1 | 8/2006 | Andre et al. | |
| 2007/0090666 A1 | 4/2007 | Brennecke et al. | |
| 2007/0122510 A1 | 5/2007 | Mendiboure et al. | |
| 2007/0134452 A1 * | 6/2007 | Merkle | B62D 25/14 |
| | | | 428/34.1 |
| 2007/0175571 A1 | 8/2007 | Rubin et al. | |
| 2007/0202314 A1 | 8/2007 | Youn et al. | |
| 2007/0257497 A1 | 11/2007 | Heatherington et al. | |
| 2008/0001434 A1 | 1/2008 | Henkelmann | |
| 2008/0048462 A1 | 2/2008 | Zabik | |
| 2008/0098601 A1 | 5/2008 | Heinz et al. | |
| 2008/0138586 A1 | 6/2008 | Mooijman et al. | |
| 2008/0156425 A1 | 7/2008 | Howe et al. | |
| 2008/0238140 A1 | 10/2008 | Kejha | |
| 2008/0246277 A1 | 10/2008 | Gallagher et al. | |
| 2008/0286522 A1 | 11/2008 | Khan et al. | |
| 2008/0317988 A1 * | 12/2008 | Mooijman | B62D 29/001 |
| | | | 428/36.9 |
| 2009/0081462 A1 | 3/2009 | Miyoshi et al. | |
| 2009/0309387 A1 | 12/2009 | Goral et al. | |
| 2010/0173126 A1 | 7/2010 | Malek et al. | |
| 2010/0187865 A1 | 7/2010 | Malek et al. | |
| 2010/0327630 A1 | 12/2010 | Klimek et al. | |
| 2011/0133517 A1 * | 6/2011 | Leanza | B62D 29/004 |
| | | | 296/203.01 |
| 2012/0112479 A1 | 5/2012 | Nagwanshi et al. | |
| 2012/0153669 A1 | 6/2012 | Nagwanshi et al. | |
| 2012/0193939 A1 | 8/2012 | Howe et al. | |
| 2012/0269999 A1 | 10/2012 | Kind et al. | |
| 2012/0309247 A1 | 12/2012 | Kleine et al. | |
| 2013/0052392 A1 | 2/2013 | Radlmayr et al. | |
| 2013/0106139 A1 | 5/2013 | Nagwanshi et al. | |
| 2013/0164501 A1 | 6/2013 | Jung et al. | |
| 2013/0181373 A1 | 7/2013 | Stock et al. | |
| 2013/0257098 A1 | 10/2013 | Matsuda et al. | |
| 2013/0309442 A1 | 11/2013 | Ruby et al. | |
| 2014/0084633 A1 | 3/2014 | Matsuda et al. | |
| 2014/0103670 A1 | 4/2014 | Iijima et al. | |
| 2014/0190445 A1 | 7/2014 | Reese et al. | |
| 2014/0203592 A1 | 7/2014 | Nagwanshi et al. | |
| 2015/0360733 A1 | 12/2015 | Nagwanshi et al. | |
| 2017/0008206 A1 | 1/2017 | Schoenhammer et al. | |
| 2017/0158252 A1 | 6/2017 | Milne et al. | |

(56) References Cited

U.S. PATENT DOCUMENTS

| | | | |
|---|---|---|---|
| 2017/0182874 A1* | 6/2017 | Shimasaki | H01M 2/1077 |
| 2017/0327157 A1* | 11/2017 | Jaunasse | B62D 29/004 |

FOREIGN PATENT DOCUMENTS

| | | |
|---|---|---|
| CN | 2044543 U | 9/1989 |
| CN | 101797822 A | 8/2010 |
| CN | 102561230 A | 7/2012 |
| CN | 102785438 A | 11/2012 |
| DE | 4115831 A1 | 11/1992 |
| DE | 102007038087 A1 | 2/2009 |
| DE | 102011104368 A1 | 3/2012 |
| DE | 102011109514 A1 | 2/2013 |
| EP | 0661198 A1 | 7/1995 |
| EP | 1473197 A1 | 11/2004 |
| EP | 1593872 A1 | 11/2005 |
| EP | 1759959 A2 | 3/2007 |
| EP | 2889187 A2 | 7/2015 |
| ES | 2260998 B2 | 11/2016 |
| FR | 2702432 A1 | 9/1994 |
| FR | 2887508 A1 | 12/2006 |
| FR | 2890361 A1 | 3/2007 |
| GB | 2375328 A | 11/2002 |
| JP | S61261012 A | 11/1986 |
| JP | H04201412 A | 7/1992 |
| JP | H07132514 A | 5/1995 |
| JP | H09020267 A | 1/1997 |
| JP | H1085842 A | 4/1998 |
| JP | 2001208120 A | 8/2001 |
| JP | 2004009726 A | 1/2004 |
| JP | 2010120167 A | 6/2010 |
| KR | 1020070122301 A | 12/2007 |
| KR | 1020090042791 A | 4/2009 |
| KR | 20130031949 A | 4/2013 |
| KR | 101396822 B2 | 12/2013 |
| KR | 20140023757 A | 2/2017 |
| WO | 2005105554 A1 | 11/2005 |
| WO | 2008016653 A2 | 2/2008 |
| WO | 2008073522 A1 | 6/2008 |
| WO | 2010108015 A3 | 9/2010 |
| WO | 2012085070 A1 | 6/2012 |
| WO | 2014060212 A1 | 4/2014 |
| WO | 2014078499 A1 | 5/2014 |

OTHER PUBLICATIONS

European Patent No. 1473197 (A1); Publication Date: Nov. 3, 2004; Abstract Only; 1 Page.

European Patent No. 1759959 (A2); Publication Date: Mar. 7, 2007; Abstract Only; 1 Page.

French Patent No. 2702432 (A1); Publication Date: Sep. 16, 1994; Abstract Only; 1 Page.

French Patent No. 2887508 (A1); Publication Date: Dec. 29, 2006; Abstract Only; 1 Page.

Grujicic et al., "Investigation of a polymer metal inter-locking technology for use in load-bearing automotive components," Multidiscipline Modeling in Materials and Structures (2010), vol. 6, No. 1, pp. 22-44.

International Preliminary Report and Written Opinion of the International Searching Authority; International Application No. PCT/US2011/055733; International Filing Date: Oct. 11, 2011; dated Dec. 28, 2011; 8 Pages.

International Search Report for International Application No. PCT/IB2015/054518; International Filing Date: Jun. 15, 2015; dated Dec. 3, 2015; 7 Pages.

International Search Report for International Application No. PCT/IB2017/058459; International Filing Date: Dec. 2017; dated Jun. 15, 2018; 6 Pages.

International Search Report; International Application No. PCT/US2011/055733; International Filing Date: Oct. 11, 2011; dated Dec. 28, 2011; 4 Pages.

International Search Report; International Application No. PCT/US2011/065798; International Filing Date: Dec. 19, 2011; dated Mar. 27, 2012; 5 Pages.

International Search Report; International Application No. PCT/US2014/011804; International Filing Date: Jan. 16, 2014; dated Apr. 24, 2014; 6 Pages.

Machine Translation of CN102785438(A); Date of Publication: Nov. 21, 2012; 11 Pages.

Machine Translation of ES2260998B2; Date of Publication: Nov. 1, 2006; 4 Pages.

Machine Translation of JPH04201412(A); Date of Publication: Jul. 22, 1992; 5 Pages.

Machine Translation of KR101396822(A); Date of Publication: Dec. 12, 2013; 11 Pages.

Machine Translation of KR20140023757(A); Date of Publication: Feb. 27, 2017; 19 Pages.

Machine Translation of WO2014060212A1; Date of Publication: Apr. 24, 2014; 17 Pages.

Witteman, Willibroordus J.; "Improved Vehicle Crashworthiness Design by Control of the Energy Absorption of Different Collision Situations"; Dictoral Dissertation, Eindhoven University of Technology; 1999; 191 Pages.

Written Opinion of the International Searching Authority for International Application No. PCT/IB2015/054518; International Filing Date: Jun. 15, 2015; dated Dec. 3, 2015; 7 Pages.

Written Opinion of the International Searching Authority for International Application No. PCT/IB2017/058459; International Filing Date: Dec. 28, 2017; dated Jun. 15, 2018; 7 Pages.

Written Opinion of the International Searching Authority; International Application No. PCT/US2011/055733; International Filing Date: Oct. 11, 2011; dated Dec. 28, 2011, 8 Pages.

Written Opinion of the International Searching Authority; International Application No. PCT/US2011/068798; International Filing Date: Dec. 19, 2011; dated Mar. 27, 2012; 6 Pages.

Written Opinion of the International Searching Authority; International Application No. PCT/US2014/011804; International Filing Date: Jan. 16, 2014; dated Apr. 24, 2014; 6 Pages.

Zoellner et al., "Plastic-Metal Hybrid—A New Development in the Injection Molding Technology," ANTEC (2002), 5 Pages.

Extended European Search Report issued in Application No. EP 19155120.9 dated Sep. 20, 2019, 55 pages.

* cited by examiner

HYBRID STRUCTURES AND METHODS OF MAKING THE SAME

CROSS REFERENCE TO RELATED APPLICATIONS

This application is a National Stage application of PCT/M2017/058459, filed Dec. 28, 2017, which claims the benefit of U.S. Provisional Application No. 62/440,546, filed Dec. 30, 2016, both of which are incorporated by reference in their entirety herein.

BACKGROUND

Reinforcing structures such as energy absorbers are often used in the manufacture of high load-bearing applications, for example automobile components and machine frames. These structures are often comprised of metals and/or composite materials. Accordingly, the reinforcement structures are often heavy and/or expensive to manufacture and difficult to incorporate into vehicles and other machines. It is often difficult to achieve a proper balance of desired characteristics such as stiffness, impact resistance, affordability, ease of manufacture, and lightweight design. For example, additional metal inserts are often required to achieve desired stiffness. It is also difficult to form metal components into more complex geometric shapes.

Furthermore, the attachment mechanisms used for such reinforcing structures are often weak and unreliable. For example, attachment mechanisms are often required between a reinforcement structure and a vehicle, as well as between individual components of the reinforcement structure itself. Often times these attachment mechanisms rely on welding, glue, adhesive, or mechanical fastening to achieve secure attachment.

Thus, there is a need for a low cost, lightweight, impact resistant, reinforcing structure with secure attachment mechanisms that can be easily manufactured and then quickly integrated into a vehicle.

SUMMARY

Disclosed, in various embodiments, are hybrid structures and methods of producing the same.

A hybrid structure, comprising: a frame member comprising at least three walls forming a channel having a convex portion where two walls meet; a concave deformation in at least one of the convex portions, wherein the concave deformation extends into the channel and has open ends forming an opening through the convex portion; and a plastic reinforcement member in the channel, wherein a portion of the reinforcement member extends into the opening and on the deformation.

A method of making the hybrid structure of any of the preceding claims, comprising: forming a frame member, wherein the frame member comprises greater than or equal to three walls forming a channel having a convex portion where two walls meet; forming a concave deformation along at least a portion of the convex portion, wherein the convex portion and the concave deformation form a gap in the wall; and over-molding a reinforcement member onto the frame member, wherein at least a portion of the reinforcement member extends into the gap to interlock with the frame member.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

The structure disclosed herein can provide a low cost, lightweight, impact resistant, reinforcing structure with secure attachment mechanisms that can be easily manufactured and then quickly integrated into a vehicle. For example, the structure disclosed herein can be a hybrid structure that achieves a balance between stiffness, impact resistance, affordability, ease of manufacture, and lightweight design. For example, the hybrid structure can achieve stiffness during impact that is greater than a heavier and more expensive metal and/or composite structure. The hybrid structure does not require additional metal inserts and can be formed into complex geometries. The hybrid structure (e.g., manufactured using a combination of a first plastic and at least one of metal, ceramic, and a second plastic (different than the first plastic; e.g., fiber reinforced plastic)) can be reduced in weight by greater than or equal to 30% as compared to the incumbent metal system that provides the same structural integrity. The hybrid structure disclosed herein can also provide secure attachment mechanisms. For example, the hybrid structure can include alternating locking mechanisms with a uniform thickness. For example, the thickness of the locking mechanism can vary by less than or equal to 10% (preferably less than 5%, or less than or equal to 3%), thus significantly increasing structural integrity. Furthermore, polymer melt can flow through openings in the alternating locking mechanism during an over-molding process. Accordingly, the locking mechanisms can be reinforced with ease. This can increase both the structural integrity of the hybrid structure and the efficiency of the manufacturing process. The hybrid structure can then be immediately integrated into an existing vehicle.

A hybrid structure can comprise a frame member. For example, the frame member can comprise at least three walls. The walls can form a channel having a convex portion where two walls meet. A concave deformation can be formed in at least one of the convex portions. For example, the concave deformation can extend into the channel. The concave deformation can have open ends forming an opening through the convex portion. A plastic reinforcement member can further be included in the channel. For example, a portion of the reinforcement member can extend into the opening and on the deformation.

The frame member can comprise at least one of metal, plastic, composite, for example, a metal. For example the frame member can comprise steel, aluminum, magnesium, or a combination comprising at least one of the foregoing. The frame member can comprise plastic, such as thermoplastic and/or thermoset. The plastic of the frame member can be different than the plastic forming the reinforcement member. For example, the glass transition temperature ($T_g$) of the materials forming the frame member can be higher than the $T_g$ of the plastic forming the reinforcement member. For example, the $T_g$ of the frame member can be greater than or equal to 50° C. higher than the plastic forming the reinforcement member. This can allow the plastic of the reinforcement member to flow and be over-molded onto the frame member while the frame member remains solid. The frame member can comprise a reinforced material, e.g., fiber reinforced plastic, such as a carbon fiber reinforced plastic.

The frame member can comprise greater than or equal to three walls (e.g., an open or closed structure). Open structure has three walls that form a channel with at least three open sides (e.g., two opposing walls and a connecting wall), while a closed structure has greater than or equal to four walls (comprising two sets of opposing walls that connect to form less than or equal to two open walls). For example, the frame member can comprise a channel that extends within the boundary of the walls. Generally, closed structures provide an increased stiffness to weight ratio and better creep performance (i.e., less deflection or deformation) compared to an open structure. An open structure can facilitate ease of tooling, however. The thickness of the walls of the metal component can all be the same or can be different to enhance stiffness in a desired direction. For example, one of the walls, e.g., the wall connecting two opposite walls, can have a different thickness than the opposing walls. In some embodiments, the walls have a thickness of less than or equal to 5 mm, specifically, 0.4 mm to 3 mm, and more specifically 0.5 mm to 1.5 mm.

The frame member can comprise a convex portion formed where two walls join. For example, the convex portion can be a curvature and/or a bend that connects two non-parallel walls, for example two perpendicular walls. The convex portion can curve away from the inner channel formed by the walls. The radius of the curvature can be, for example, 1 mm to 20 mm, for example, 2 mm to 15 mm, for example, 5 mm to 10 mm. The frame member can further comprise concave deformation(s) in the convex portion(s). For example, the concave deformations can extend into the channel, e.g., in a direction opposite the convex portions.

The concave deformation can be formed from a convex portion. Accordingly, the concave deformation can maintain a uniform thickness. In other words, the material comprising the walls of the frame member need not be stretched or thinned in order to create the concave curvature. The thickness of the walls before the concave deformation(s) are formed, is greater than or equal to 90% of the wall after the concave portion is formed; i.e., the change in thickness of the wall at the deformation is less than 10%, preferably less than 5%, or even less than or equal to 3%. Not to be limited by theory, it is believed that this is because the curvature of the convex portion already exists where two walls meet. This curvature is then merely extended in the opposite direction to form a concave deformation. The radius of the concave deformation can be equal to the radius of the convex portion of the frame member. Accordingly, the locking mechanisms have increased strength and are easier to manufacture.

The concave deformations can comprise open ends. For example, the open ends can form openings/gaps through the convex portion. The concave deformations located in the convex portions can create an alternating locking mechanism. For example, polymer melt can flow through the openings/gaps during an over-molding process, thus interlocking the polymer with the frame member. In other words, the openings/gaps can function as flow runners thus increasing the efficiency of the over-molding process. The strength of attachment between the frame member and the polymer is also increased. There can be a direct connection between a surface of the polymer (plastic reinforcement member) and a surface of the openings in the convex portion of the frame member. For example, greater than or equal to 50% of a surface of the convex portion can be directly contacted with polymer, for example, greater than or equal to 70%. When a frame member comprises two or more convex portions, the concave deformations in one convex portion of the frame member can be directly aligned or alternate with the concave deformations of an opposing convex portion. For example, a locking mechanism with an alternating arrangement can have increased structural integrity. An alternating arrangement can also reduce the amount of space occupied by the concave deformations.

For comparative purposes, a frame member "A" can comprise a concave deformation in a central portion of a wall. In other words, the concave deformation is formed along a flat portion of the preformed frame member "A". Accordingly, the concave deformation is of non-uniform thickness. For example, portions of the concave deformation can be reduced in thickness by greater than or equal to 30% when compared to a thickness of the flat portion of the preformed frame member "A". This is because the flat surface (a straight line) is being deformed into a longer curve while still maintaining the same end points. In other words, in order to form the necessary curvature in the flat surface, the material comprising the wall must be stretched and/or thinned in order to traverse the longer curved distance. This compromises the strength of the deformation as an attachment mechanism and is more difficult to manufacture.

A reinforcement member can be overmolded onto a frame member creating a hybrid structure. For example, the plastic reinforcement member can have an array of columns and channels, e.g., a honeycomb structure. The channels can be oriented, for example, parallel or perpendicular to one or more of the frame member walls. The combs of the reinforcement structure can be a shape having greater than or equal to 3 sides, such as triangular, quadrilateral, pentagonal, hexagonal, heptagonal, and octagonal, and so forth, geometries, as well as combinations comprising at least one of the foregoing geometries, and specifically a honeycomb (e.g., a hexagonal) geometry. Optionally, the channels of the structure extend from one end of the structure to the other end of the structure, so that the structure is open on both ends, and wherein one end (e.g., the second end of the channel) can optionally be disposed in physical contact with a side of the frame member, thereby effectively blocking the second end.

Reinforcement member can be made by bonding extruded polymer tubes together, injection molding the polymer channels, extruding the structure, or otherwise formed. For example, the element can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different polymer for particular combs, or a combination comprising at least one of the foregoing. Similarly, noise dampening properties can be attained and controlled. One possible fill material is foam. Desirably, the structure is formed by over-molding the frame member using an injection molding process.

The plastic reinforcement member can further or alternatively comprise a rib structure. For examples, ribs can extend across the channel of the frame member, between sidewalls and/or a back wall. Various rib designs are possible, including triangular, wave, diagonal, crossed, and the like. For example, the ribs can form a triangular, rectangular, "X", or other structure.

The orientation of the channels and/or rib structure with respect to the channel in the support can also be chosen to attain the energy absorption characteristics of a vehicle component. For example, the support can have channels that can be oriented 0 degrees (e.g., parallel) to 90 degrees (perpendicular), to the channel of the frame member. In other words, in some embodiments, the reinforcement channels (e.g., honeycombs) can have a common axis with the channel and extend parallel thereto. In other embodiments, the reinforcement channels (e.g., honeycombs) can extend perpendicular to the channel.

The frame member and the plastic reinforcement member can, independently, comprise various polymeric materials, e.g., thermoplastic, thermoset and combinations comprising at least one of the foregoing. The particular material can be chosen based upon its properties, the desired location in the vehicle, and the characteristics of that location. For example, in some embodiments, the material can have moderate stiffness (e.g., Young's modulus of 0.8 gigaPascals (GPa) to 30 GPa, specifically, 3 GPa to 15 GPa, for example 7.0 GPa), good elongation (e.g., greater than 1% elongation), chemical resistance and/or heat resistance under vehicle manufacturing conditions (e.g., welding, painting, etc., for example, at temperatures 400° F. for 30 minutes, which enables the plastic reinforcement member to maintain integrity as the part travels with the auto body through paint bake). Examples of polymers include thermoplastic materials as well as combinations comprising thermoplastic materials. Possible thermoplastic materials include polycarbonate; polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride (PVC); high impact polystyrene (HIPS); polyethylene (e.g., low/high density polyethylene (L/HDPE)); polypropylene (PP) (e.g., expanded polypropylene (EPP)); polyetherimide; and thermoplastic olefins (TPO), as well as combinations comprising at least one of the foregoing. For example, the plastic reinforcement member can comprise Noryl™ GTX resin, LEXAN™ resin, ULTEM™ resin, VALOX™ resin, CYCOLAC™ resin, and/or STAMAX™ resin, which are commercially available from SABIC. Desirably, the plastic reinforcement member comprises polypropylene, and/or blends of polyphenylene ether/polyamide.

The plastic reinforcement member can optionally be reinforced, e.g., with fibers, particles, flakes, as well as combinations comprising at least one of the foregoing. These fibers may include glass, carbon, bamboo, aramid, kevelar etc., as well as combinations comprising at least one of the foregoing. For example, the plastic reinforcement member can be formed from STAMAX™ materials, a long glass fiber reinforced polypropylene commercially available from SABIC. The plastic reinforcement member and/or frame member can also be made from combinations comprising at least one of any of the above-described materials and/or reinforcements, e.g., a combination with a thermoset material. The frame member can comprise continuous fibers (e.g., glass, carbon, aramid, kevelar, as well as combinations comprising at least one of the foregoing) in a polymeric matrix (e.g., of polyetherimide, polyamide (nylon), polyphenylene oxide, polycarbonate, polypropylene, as well as combinations comprising at least one of the foregoing).

Good adhesion between the frame member and plastic reinforcement member can be attained with compatibility between the material of the frame member and the material of the reinforcement member. For example the frame member can be made of continuous carbon fiber reinforced composite with base resin of nylon, and the polymer of the plastic reinforcement member can also comprise nylon resin or any other resin blended with nylon like SABIC's Noryl™ GTX. Another example, the frame member is made of continues glass fiber reinforced composite material with polypropylene as resin matrix, and reinforcement member can comprise a polypropylene based material or short/long fiber reinforced polypropylene composite like SABIC's STAMAX™ resin.

As discussed herein, the concave deformations located in the convex portions can create an alternating locking mechanism. For example, polymer melt can flow through the openings/gaps during an over-molding process, thus interlocking the reinforcement member with the frame member. The formed hybrid structure can comprise attachment locations. For example, attachment locations can be located at a top, bottom, or intermediate location of the hybrid structure and can be configured to attach to a vehicle component. For example, designated locations along the hybrid structure can remain open (not over-molded with plastic) for attachment purposes. The vehicle component can comprise for example, a body in white (BIW), a frame, a rail, a bumper, a front end module, a pillar, or cross-bar. Attachment locations can comprise mechanical fastenings mechanisms such as screws and/or bolt, adhesives, and can also serve as sites for welding. Examples of mechanical fixing measures include snaps, hooks, screws, bolts (e.g., threaded bolts, rivets, welds, crimp(s) (e.g., the crimped metal wall). A friction fit can also be used to maintain the reinforcement in place. Chemical fixing measures can include bonding agents such as glues, adhesives, and so forth. The vehicle component can comprise for example, a body in white, a frame, a rail, a bumper, a front end module, a pillar, or cross-bar.

The overall size, e.g., the specific dimensions of the hybrid structure can depend for example upon its location in a vehicle and its function. The length of the frame member is dependent upon the particular area of the vehicle component, while the length of the plastic reinforcement member is dependent upon the amount and location of enhanced structural integrity in the frame member. The plastic reinforcement member can have a length commensurate with the length of the frame member or less than the length of the frame member (e.g., can be localized; i.e., disposed only in a specific location to attain enhanced structural integrity of that location). Desirably, to maximize the weight reduction, the reinforcement member is localized so as to add the minimum amount of weight needed to attain a desired structural integrity (e.g., a structural integrity that is greater than or equal to the standard metal component without the thinner walls). The hybrid structure can have a length of less than or equal to 1,000 mm, specifically, less than or equal to 800 mm, and more specifically, less than or equal to 300 mm. The length of the hybrid structure can be less than or equal to 80% of the length of the vehicle component, specifically, less than or equal to 60%, more specifically, less than or equal to 50%, and yet more specifically, 10% to 35% of the length of the vehicle component. For example, the hybrid structure can have a length of 150 mm to 350 mm, specifically, 200 mm to 250 mm, such as for use in a pillar or rail. In other embodiments, the hybrid structure has a length of 500 mm to 800 mm, specifically, 600 mm to 700 mm, such as for use in a floor rocker. When the vehicle component is a hollow metal element, the hybrid structure can be disposed in the hollow space. When the hybrid structure is not located throughout the hollow space in the vehicle component, it can be attached to the vehicle component to inhibit the reinforcement from being dislodged during use of the vehicle or during an impact.

Furthermore, the characteristics of the plastic reinforcement member will depend upon the energy absorption characteristics desired in the particular area, e.g., the number of combs or ribs per unit area, the thickness of the comb walls or ribs, and the specific material of the plastic reinforcement member. The density of combs (number of combs per unit area) is dependent upon the desired stiffness, crush characteristics, and materials employed. In some embodiments, the density can be 1 to 20 combs per 100 mm$^2$, specifically, 1 to 10 combs per 100 mm$^2$, and more specifically 1 to 5 combs per 100 mm$^2$. In various embodiments, the thickness of the walls of the plastic reinforcement can be 0.5 mm to 10 mm, specifically, 2 mm to 5 mm, and more specifically 2.5 mm to 4 mm. Generally, a reinforcement will comprise greater than or equal to 10 combs, specifically, greater than or equal to 20 combs, and more specifically, greater than or equal to 30 combs Some possible vehicle component material(s) include polymers (e.g., thermoplastic and/or thermoset), composite, metals, and combinations comprising at least one of the foregoing. Some metals include aluminum, titanium, chrome, magnesium, zinc, and steel, as well as combinations comprising at least one of the foregoing materials. The thickness of the walls of the vehicle component can all be the same or can be different to enhance stiffness in a desired direction. For example, one set of opposing walls can have a greater/lesser thickness than the other set of opposing walls. In some embodiments, the vehicle components have a wall thickness of less than or equal to 1.6 mm, specifically, 1.0 mm to 1.5 mm, and more specifically 1.3 mm to 1.4 mm. Generally, metal walls (e.g., floor rocker, rails, pillars, bumper beam, and so forth), have a wall thickness of greater than 1.8 mm. Therefore, the use of the hybrid structure enables a reduction in wall thickness (of the vehicle component) of greater than or equal to 10%, specifically, greater than or equal to 20%, and even greater than or equal to 25%.

The hybrid structures disclosed herein are configured to absorb a significant amount of impact energy when subjected to axial loading while also having acceptable creep performance (i.e., less deformation upon impact). This makes these structures useful as supporting members to other vehicle components. The hybrid structures disclosed herein, which can be co-molded, provide an integrated energy absorbing device (e.g., a crush can) to prevent vehicle damage (e.g., damage to the body in white (BIW) or frame of the vehicle) upon impact. The hybrid structures disclosed herein utilize various designs of a co-molded metal component and plastic component to absorb energy upon impact, with reduced creep as compared to a wholly plastic component, and with a low cost, lightweight design. The hybrid structures can reduce repair costs of the vehicle after impact. For example, the hybrid structures can reduce damage by absorbing the energy upon impact such that the BIW is not damaged or hardly damaged.

The hybrid structures can be used in various locations in a vehicle. Generally, the hybrid structures can be located behind the bumper beam and steel structure to which the bumper beam is attached, but in front of the BIW to serve as protection to the BIW from damage upon the application of force caused by an impact. In other words, between the BIW and the structure to which the bumper beam attaches. Other components which the hybrid structure can be used to protect include: headlamp(s), the hood, the radiator, and the vehicle rails all intended for use in front of or behind the front bumper of the vehicle; and the tailgate, deck-lid, and tail-lamps all intended for use in front of or behind the rear bumper of vehicle as well as other components, such as the floor runner, the floor rocker, the cross beam, and combinations comprising at least one of these components. The hybrid structures can be integrated into open channel systems. For example, an open channel can have an open curve at any cross-section along its length, for example, a "C" shape. The hybrid structures can be integrated into closed channel systems. For example, a closed channel system can have a closed geometry at any cross-section along its length, for example, an "O" shape, or a polygonal shape. The hybrid structures can also be integrated into stationary structures, for example, commercial buildings and/or residential houses.

The hybrid structure can be produced by several co-molding processes including insert molding (e.g., overmolding). The frame member can be formed by extrusion into the desired shape (e.g., a rectangular box like shape) and then the plastic reinforcement member can be insert molded into the frame member using, for example, an insert injection molding process. The component of the vehicle or other structure that is to be replaced by the hybrid structure can first be tested for structural integrity. Accordingly, a minimum structural integrity needed for the hybrid structure can be determined. The size of the component to be replaced can then be altered, for example, reduced in size, and modified with a locking mechanism and reinforcement member. Accordingly, the size and weight of the component to be replaced can be reduced while maintaining or increasing structural integrity. For example, hybrid structures intended for vehicle use can be designed to withstand forces greater than or equal to 20 kiloNewtons (kN), for example, greater than or equal to 30 kN, or greater than or equal to 50 kN, or greater than or equal to 100 kN. Hybrid structures intended for use in stationary structures can be designed to withstand forces greater than or equal to 5 kN.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 3:
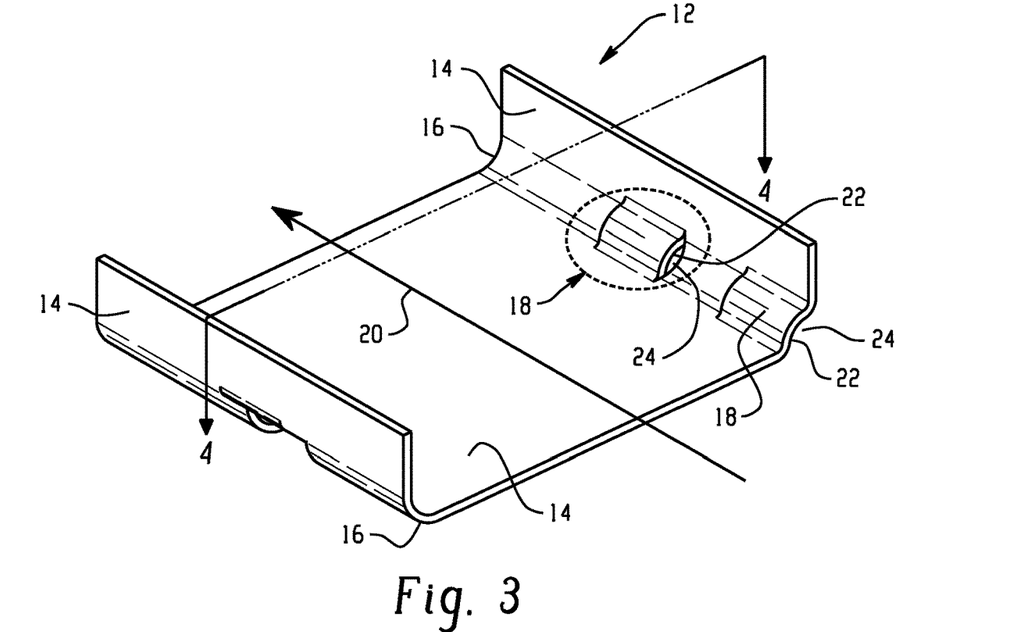
FIG. 3 is an image taken from a LS-DNYA computer simulation representing an embodiment of deformations of uniform thickness and located on the convex portion of the frame member, e.g., where walls intersect.

Referring now to FIG. 3, a frame member 12, for use in a hybrid structure, can comprise walls 14. For example, frame member 12 can comprise greater than or equal to three walls 14. Accordingly, a channel 20 can be formed and extend within the boundary of the walls 14. A convex portion 16 of the walls 14 is located where two walls 14 meet. For example, convex portion 16 can be a curvature that connects two perpendicular walls 14. For example, the convex portion 16 can extend outward and away from the channel 20. The frame member 12 can further comprise concave deformations 18 in the convex portions 16. For example, the concave deformations 18 can extend into the channel 20. For example, the concave deformations 18 can extend in a direction opposite the convex portions 16. The concave deformations 18 can have a uniform thickness. The concave deformations 18 can comprise open ends 22. For example, the open ends 22 can form openings/gaps 24 through the convex portion 16. The concave deformations 18 located in the convex portions 16 can create an alternating locking mechanism. For example, polymer melt can flow through the openings/gaps 24 during an over-molding process, thus interlocking the polymer with the frame member 12.

Figure 4A:
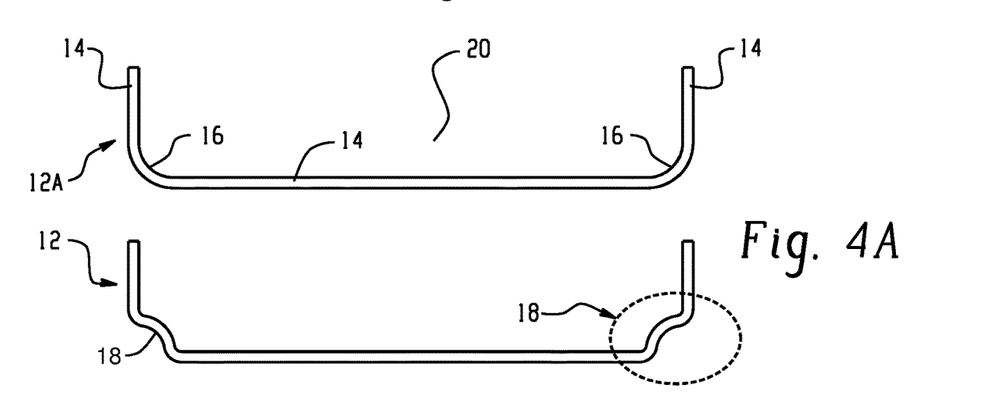
FIG. 4A is a cross sectional end view of the walls of FIG. 3 taken along lines 4-4, comprising the deformation, before and after forming the deformation.
Figure 4B:
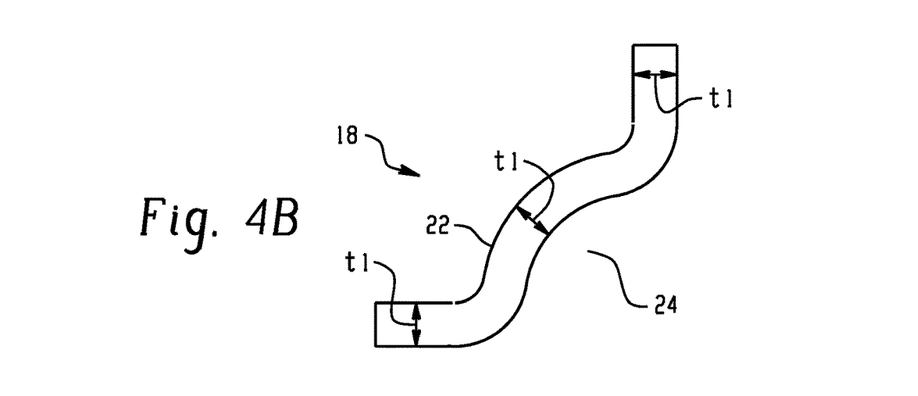
FIG. 4B is a partial, expanded view of the deformation of FIG. 4A.

Referring now to FIG. 4A and FIG. 4B, a preformed frame member 12A can comprise walls 14 and convex portions 16 where two walls 14 meet. Concave deformations 18 can then be formed in the convex portions 16 to create the formed frame member 12. FIG. 4B depicts a side view of a concave deformation 18 comprising an open end 22 and an opening/gap 24. Since concave deformation 18 is formed from a convex portion 16, the concave deformation 18 can maintain a uniform thickness $t_1$. In other words, the material comprising the walls 14 of the frame member 12 need not be stretched or thinned in order to create the curvature. This is because the curvature of convex portion 16 already exists where two walls 14 meet. The curvature is then merely extended in the opposite direction to form a concave deformation 18.

Figure 1:
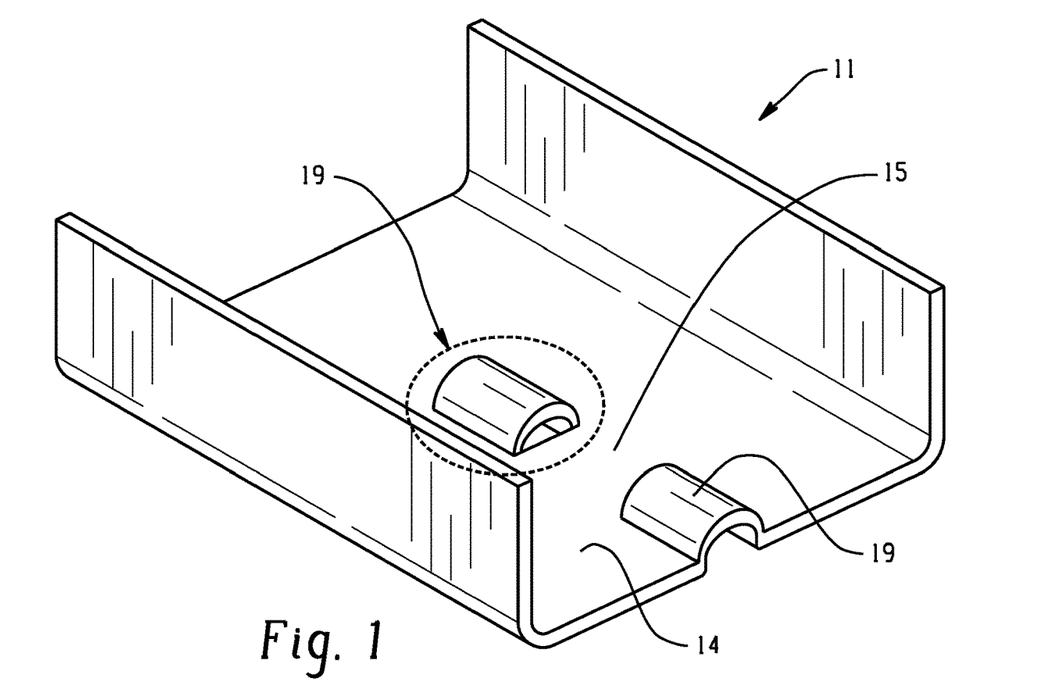
FIG. 1 is a perspective view image taken from a LS-DNYA computer simulation representing an embodiment of deformations of non-uniform thickness and located in a center of a wall of a frame member; i.e. along a flat portion of the frame member.
Figure 2A:
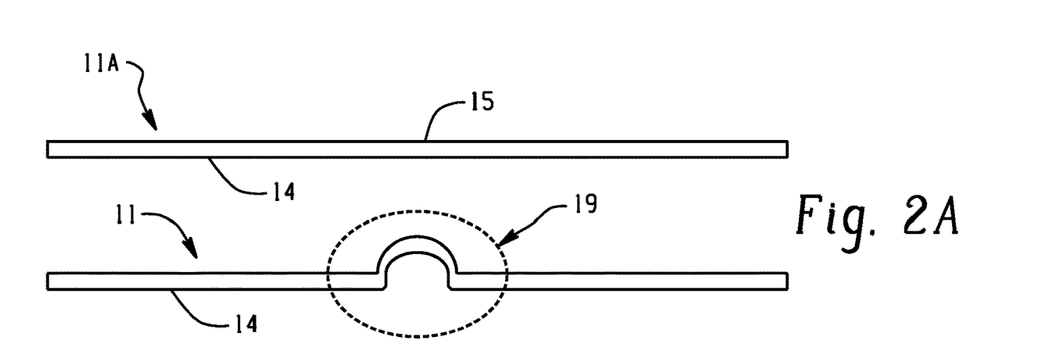
FIG. 2A is a cross sectional end view of a portion of a wall comprising the deformation, before and after forming the deformation.
Figure 2B:
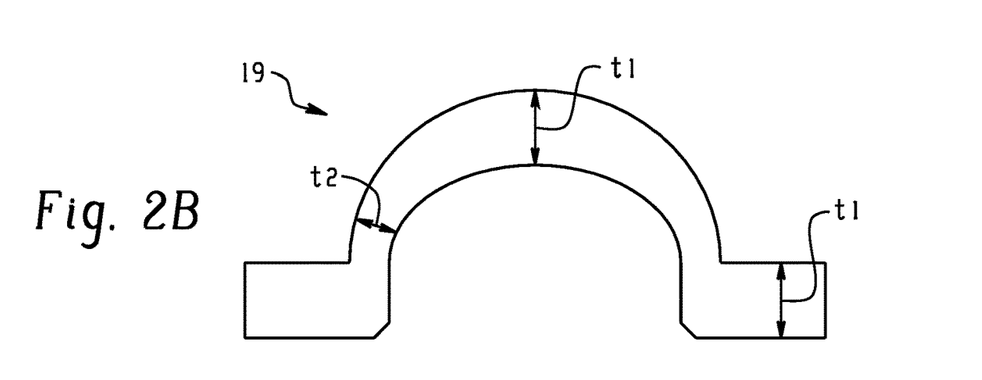
FIG. 2B is a partial, expanded view of the deformation of FIG. 2A.

Referring now to FIG. 1, FIG. 2A, and FIG. 2B, a frame member 11 can comprise a concave deformation 19 in a central portion 15 of a wall 14. In other words, the concave deformation 19 is formed along a flat portion 15 of the preformed frame member 11A.

Figure 5A:
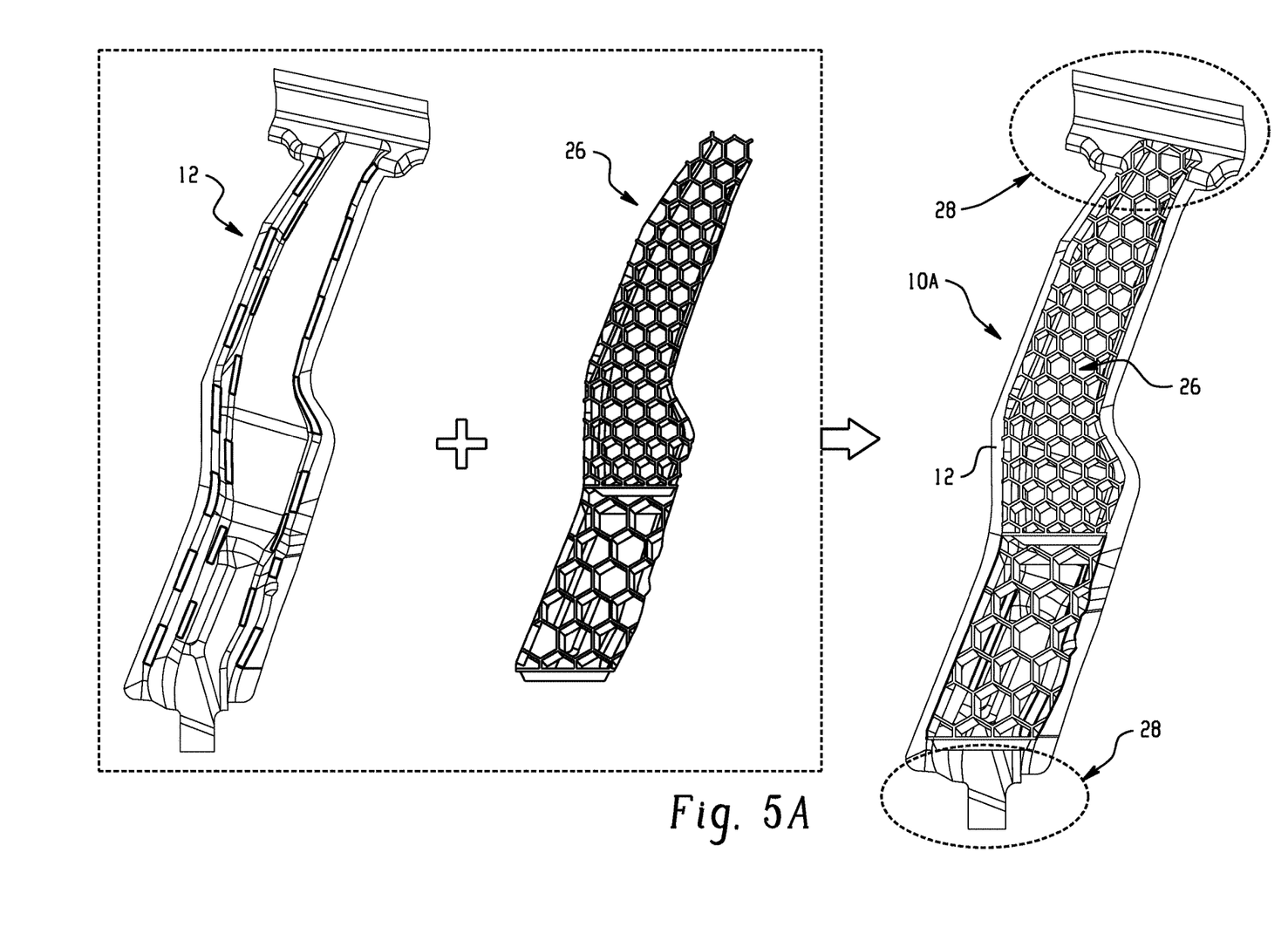
FIG. 5A is a frontal view of a diagram representing an embodiment of over-molding of a plastic reinforcement onto a frame member to form a hybrid structure.
Figure 5B:
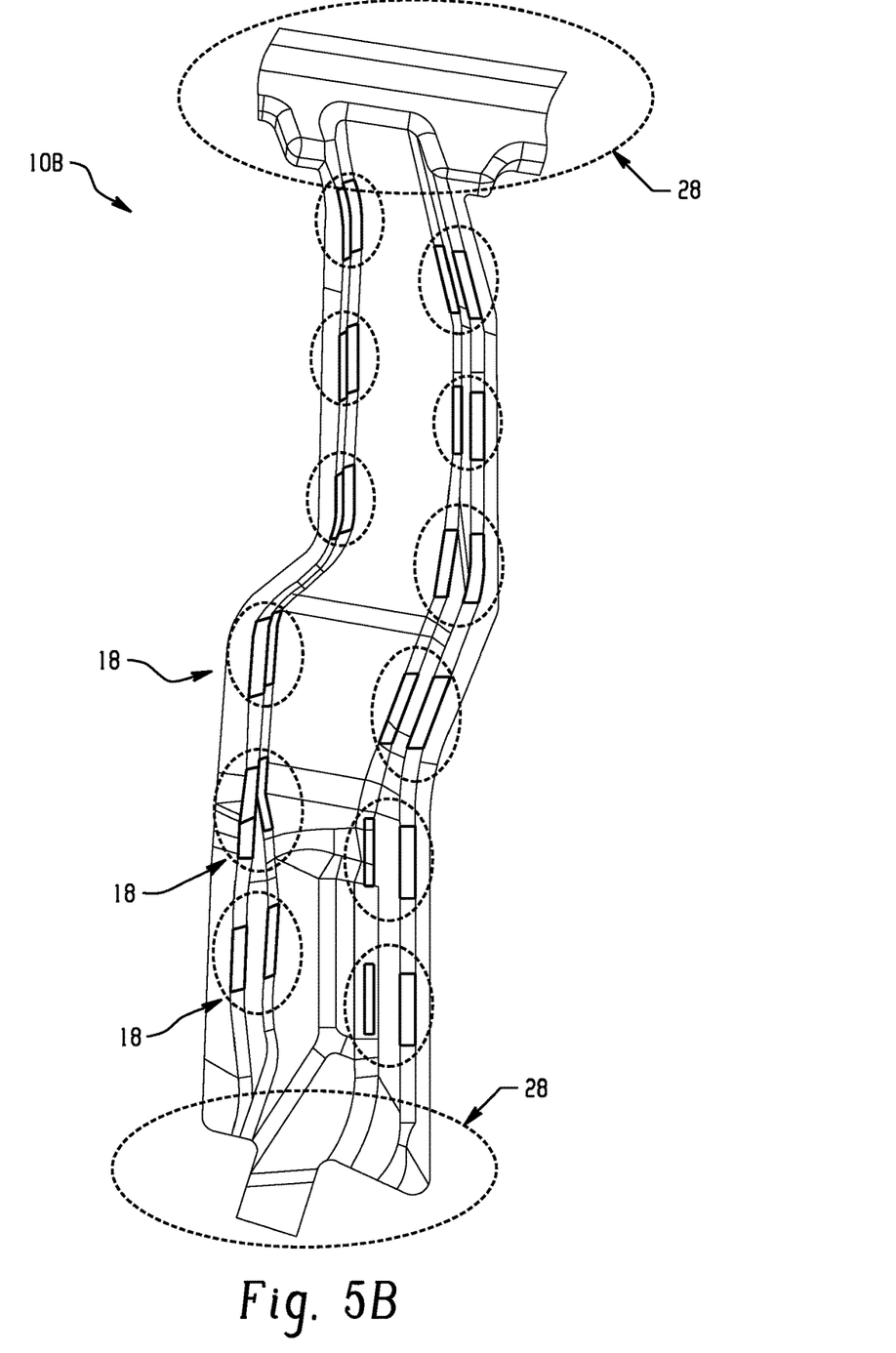
FIG. 5B is a diagram representing a rear view of an embodiment of a formed hybrid structure.

Referring now to FIG. 5A and FIG. 5B, a plastic reinforcement member 26 can be overmolded onto a frame member 12 creating a hybrid structure 10. For example, the reinforcement portion 26 can comprise thermoplastic and be formed into a honeycomb pattern. As discussed herein with regards to FIG. 3, the concave deformations 18 located in the convex portions 16 can create an alternating locking mechanism. For example, polymer melt can flow through the openings/gaps 24 during an over-molding process, thus interlocking the plastic reinforcement member 26 with the frame member 12. A can be seen from front view 10A and rear view 10B, the formed hybrid structure 10 comprises attachment locations 28. For example, attachment locations 28 can be located at the top or bottom of the hybrid structure 10 and can be configured to attach to a vehicle. Rear view 10B also depicts concave deformations 18 where the reinforcement member 26 and the frame 12 interlock.

Figure 7A:
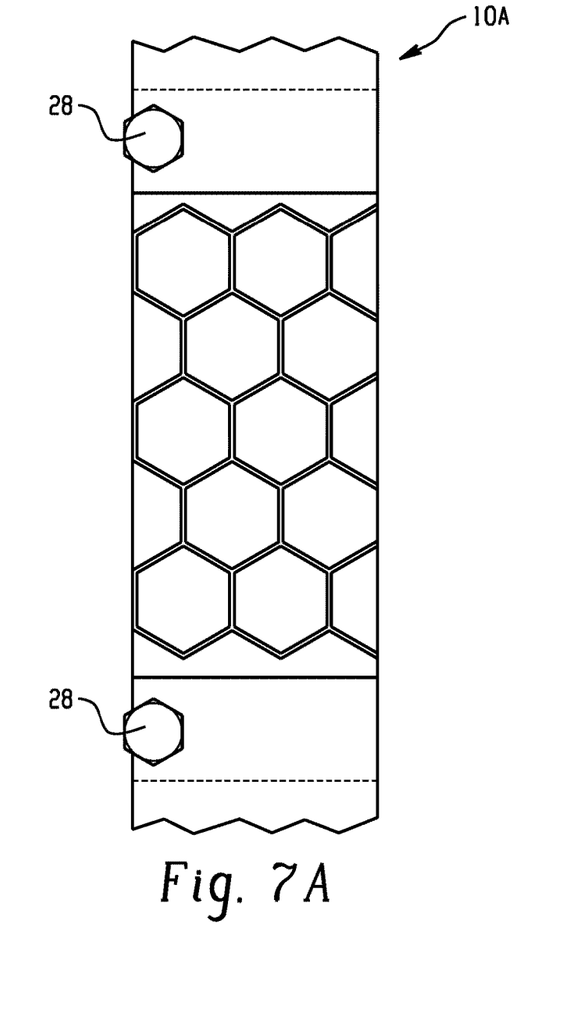
FIG. 7A (front view) and FIG. 7B (side view) are diagrams representing an embodiment of attachment of a hybrid structure to a vehicle component.
Figure 7B:
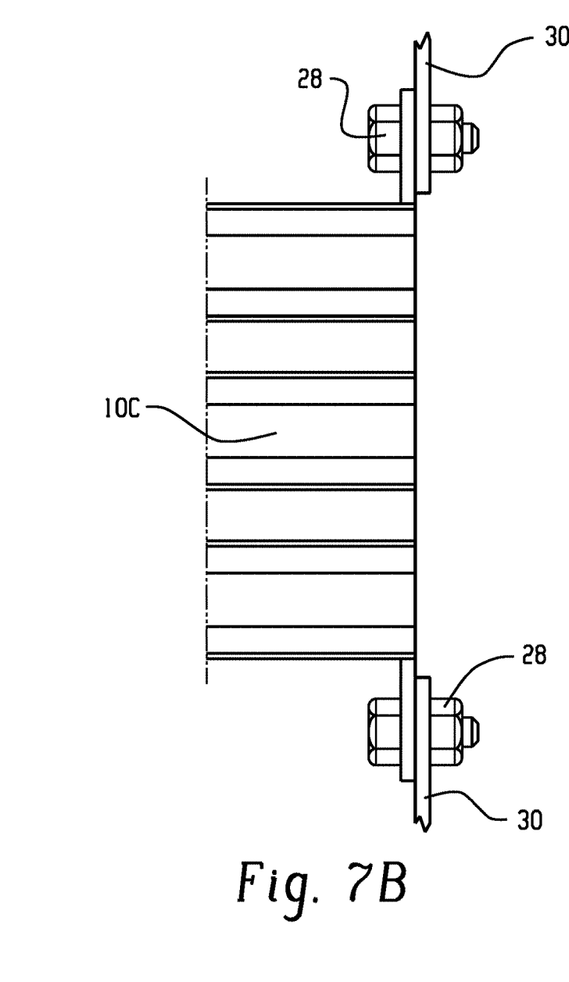

Referring now to FIG. 7A and FIG. 7B, hybrid structure 10 (front view 10A, side view 10C) can be attached to a vehicle component 30 via attachment locations 28. For example, attachment locations 28 can comprise mechanical fastenings mechanisms such as screws and/or bolts, adhesives, and can also serve as sites for welding. The vehicle component 30 can comprise for example, a body in white, a frame, a rail, a bumper, a front end module, a pillar, or cross-bar.

The following examples are merely illustrative of the hybrid structures disclosed herein and are not intended to limit the scope hereof.

EXAMPLES

TABLE 1

| Material Description | | |
|---|---|---|
| Component | Description | Source |
| Steel | Medium strength steel, yield stress = 555 megaPascal | SABIC Innovative Plastics |
| Plastic | Young's Modulus = 7 gigaPascal | SABIC Innovative Plastics |

Example 1

Simulations were preformed using LS-DYNA for the purposes of this example. LS-DYNA is an advanced general-purpose Multiphysics simulation software package developed by the Livermore Software Technology Corporation (LSTC). FIG. 1 represents a frame member formed with centrally located deformations. FIG. 3 represents a frame member in accordance with the present disclosure comprising concave deformations along a convex curvature in the frame wall. Steel is used to simulate the frame members. As depicted in FIG. 1, the deformations of the frame wall are not uniform in thickness. The outer edges of the deformations have been significantly thinned and have a thickness of only 0.7 millimeters (mm) ($t_2$) as compared to the remainder of the frame wall which has a thickness of 1.2 millimeters ($t_1$) (see FIGS. 2A and 2B). In contrast, the deformations in accordance with the present disclosure, shown in FIG. 3, maintain a uniform thickness of 1.2 millimeters (see FIGS. 4A and 4B). The uniform thickness of the present deformations results in significantly improved structural integrity of the hybrid structure.

Example 2

Figure 6:
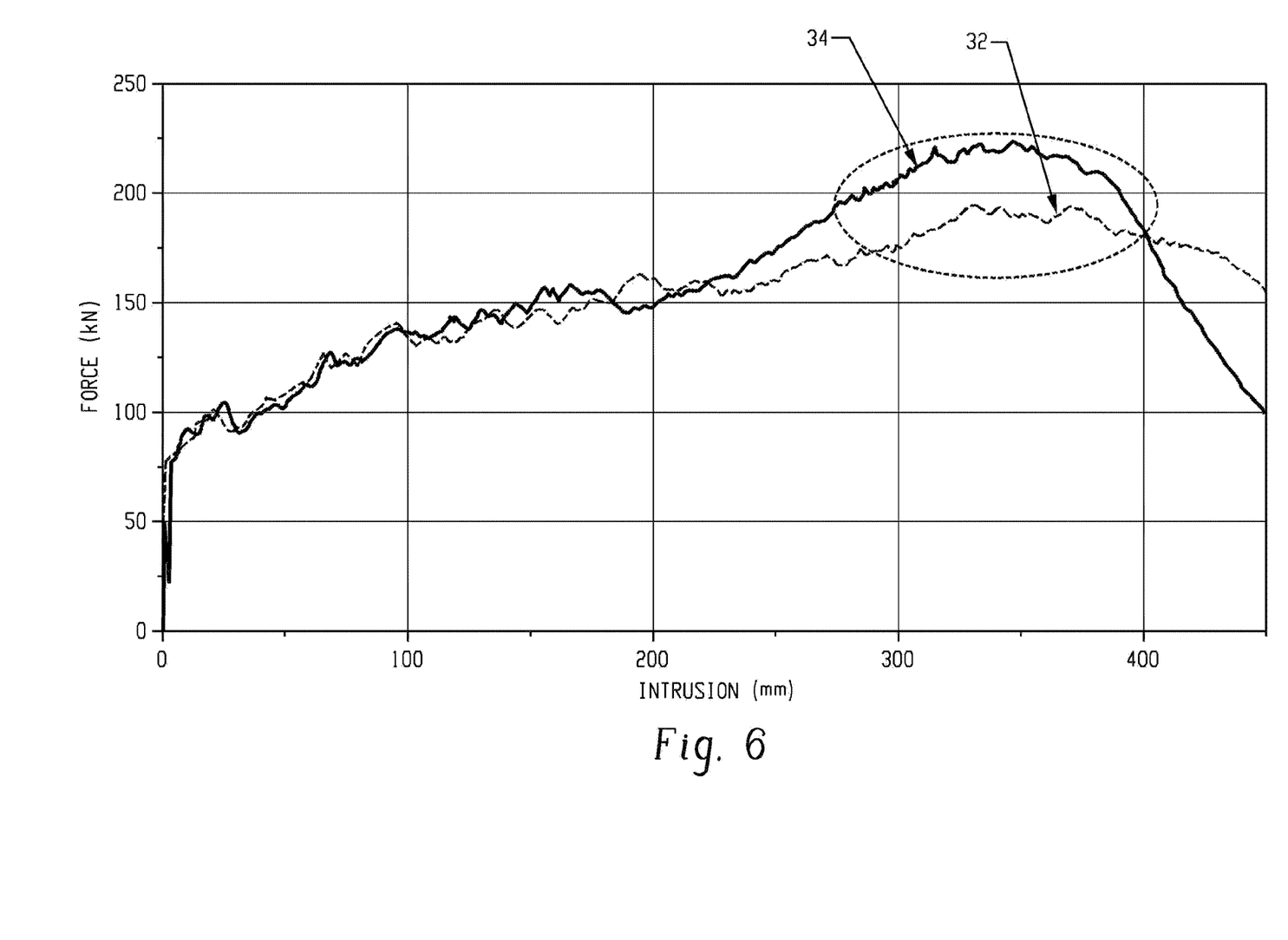
FIG. 6 is a chart comparing the intrusion during impact of hybrid structures without the deformations at the junction of walls as compared to hybrid structures having deformations at the junction of walls.

Simulations were preformed using LS-DYNA for the purposes of this example. FIG. 6 is a chart comparing the intrusion during impact of Structure A (line 32) as compared to Structure B (line 34). An impact speed of 50 kilometers per hour is used for the purposes of the example. The hybrid structure with the deformations in the flat portion of the frame member (Structure A) was simulated using all steel components weighing a total of 4.5 kilograms. The hybrid structure with the deformations along the convex curvature (e.g., the corner) of the frame member (Structure B) was simulated using a steel frame (1.0 millimeter, 2.2 kilograms) and plastic reinforcement (2-3.5 millimeters, 0.8 kilograms) weighing a total of 3.0 kilograms. FIG. 6 demonstrates the unexpected and advantageous properties of Structure B. As depicted in FIG. 6, hybrid Structure B surprisingly outperforms the metal Structure A in terms of stiffness during impact.

Example 3

Simulations were performed using LS-DYNA for the purposes of this example. An injection mold time of 2.6 seconds was achieved for Structure B. A maximum injection pressure of 77.87 megaPascal was achieved for Structure B. It is noted that these values adhere to industry standards.

The articles and methods disclosed herein include(s) at least the following embodiments:

Embodiment 1

A hybrid structure, comprising: a frame member comprising at least three walls forming a channel having a convex portion where two walls meet; a concave deformation in at least one of the convex portions, wherein the concave deformation extends into the channel and has open ends forming an opening through the convex portion; and a plastic reinforcement member in the channel, wherein a portion of the reinforcement member extends into the opening and on the deformation.

Embodiment 2

The method of Embodiment 1, wherein the frame member comprises metal, plastic, composite, or a combination comprising at least one of the foregoing.

Embodiment 3

The method of any of the preceding embodiments, wherein the frame member comprises a first material and the reinforcement member comprises a material different from the first material.

Embodiment 4

The method of Embodiment 1, wherein the hybrid structure is reduced in mass by greater than or equal to 30% compared to a metal structure comprising only metal while having a stiffness during impact that is greater than or equal to the stiffness of a the metal structure.

Embodiment 5

The method of any of the preceding embodiments, wherein the frame member comprises steel, aluminum, magnesium, or a combination comprising at least one of the foregoing.

Embodiment 6

The method of any of the preceding embodiments, wherein the reinforcement member comprises thermoplastic.

Embodiment 7

The method of any of the preceding embodiments, wherein at least one wall further comprises an additional concave deformation located away from the convex portions.

Embodiment 8

The method of Embodiment 7, wherein the additional concave deformation is located in a central portion of the at least one wall.

Embodiment 9

The method of any of the preceding embodiments, wherein the concave deformation is of uniform thickness.

Embodiment 10

The method of Embodiment 9, wherein an individual concave deformation varies in thickness less than or equal to 10%, preferably less than or equal to 5%, or less than or equal to 3%.

Embodiment 11

The method of Embodiment 9, wherein the concave deformation has a uniform thickness of 1 millimeter to 2 millimeters.

Embodiment 12

The method of any of the preceding embodiments, wherein the reinforcement member comprises a honeycomb structure and/or ribbed pattern, preferably a honeycomb structure.

Embodiment 13

The method of any of the preceding embodiments, wherein the hybrid structure is free of additional metal inserts.

Embodiment 14

The method of any of the preceding embodiments, further comprising at least two convex portions, wherein each convex portion comprises at least one concave deformation.

Embodiment 15

The method of any of the preceding embodiments, wherein the hybrid structure is configured for integration with an open channel system and/or a closed channel system.

Embodiment 16

The method of any of the preceding embodiments, wherein the hybrid structure is configured to attach to a vehicle component.

Embodiment 17

The method of Embodiment 16, wherein the vehicle component comprises a body in white, beam, rail, bumper, front-end module, seat, chassis, cross-bar, floor, pillar, frame, or a combination comprising at least one of the foregoing.

Embodiment 18

The method of Embodiment 16, wherein the hybrid structure is configured to attach to the vehicle component via mechanical fastening, welding, adhesion, or a combination comprising at least one of the foregoing.

Embodiment 19

A method of making the hybrid structure of any of the preceding claims, comprising: forming a frame member, wherein the frame member comprises greater than or equal to three walls forming a channel having a convex portion where two walls meet; forming a concave deformation along at least a portion of the convex portion, wherein the convex portion and the concave deformation form a gap in the wall; and over-molding a reinforcement member onto the frame member, wherein at least a portion of the reinforcement member extends into the gap to interlock with the frame member.

Embodiment 20

The method of Embodiment 19, wherein the gap in the wall is configured to function as a flow-runner during the over-molding process.

Embodiment 21

The method of any of Embodiments 19-20, further comprising attaching the hybrid structure to a vehicle component.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A hybrid structure, comprising:
   a frame member comprising at least three walls forming a channel having a convex portion where two walls meet;
   a concave deformation in at least one convex portion, wherein the concave deformation extends into the channel and has open ends forming an opening through the convex portion; and
   a plastic reinforcement member in the channel, wherein a portion of the reinforcement member extends into the opening and on the concave deformation.

2. The hybrid structure of claim 1, wherein the frame member comprises a first material and the reinforcement member comprises a second material different from the first material.

3. The hybrid structure of claim 1, wherein the hybrid structure is reduced in mass by greater than or equal to 30% compared to a metal structure comprising only metal while having a stiffness during impact that is greater than or equal to the stiffness of the metal structure.

4. The hybrid structure of claim 1, wherein the frame member comprises steel, aluminum, magnesium, or any combination thereof.

5. The hybrid structure of claim 1, wherein the reinforcement member comprises thermoplastic.

6. The hybrid structure of claim 1, wherein at least one wall further comprises an additional concave deformation located away from the convex portion.

7. The hybrid structure of claim 6, wherein the additional concave deformation is located in a central portion of the at least one wall.

8. The hybrid structure of claim 1, wherein the concave deformation is of uniform thickness.

9. The hybrid structure of claim 8, wherein an individual concave deformation varies in thickness by less than or equal to 10%.

10. The hybrid structure of claim 8, wherein the concave deformation has a uniform thickness of 1 millimeter to 2 millimeters.

11. The hybrid structure of claim 1, wherein the reinforcement member comprises a honeycomb structure, a ribbed pattern, or a combination thereof.

12. The hybrid structure of claim 1, wherein the hybrid structure is free of additional metal inserts.

13. The hybrid structure of claim 1, further comprising at least two convex portions, wherein each convex portion comprises at least one concave deformation.

14. The hybrid structure of claim 1, wherein the hybrid structure is configured for integration with an open channel system, a closed channel system, or a combination thereof.

15. The hybrid structure of claim 1, wherein the hybrid structure is configured to attach to a vehicle component.

16. The hybrid structure of claim 15, wherein the vehicle component comprises a body in white, beam, rail, bumper, front-end module, seat, chassis, cross-bar, floor, pillar, frame, or any combination thereof.

17. The hybrid structure of claim 15, wherein the hybrid structure is configured to attach to the vehicle component via mechanical fastening, welding, adhesion, or any combination thereof.

18. A method of making the hybrid structure of claim 1, comprising:
    forming a frame member, wherein the frame member comprises greater than or equal to three walls forming a channel having a convex portion where two walls meet;
    forming a concave deformation along at least a portion of the convex portion, wherein the convex portion and the concave deformation form a gap in the wall; and
    over-molding a reinforcement member onto the frame member, wherein at least a portion of the reinforcement member extends into the gap to interlock with the frame member.

19. The method of claim 18, wherein the gap in the wall is configured to function as a flow-runner during the over-molding process.

20. The method of claim 18, further comprising attaching the hybrid structure to a vehicle component.

* * * * *